INVENTOR.
EDMUND RUSSELL ALTONJI
BY
Laurence S. Epstein
ATTORNEYS

Oct. 4, 1966 E. R. ALTONJI 3,277,246

APPARATUS FOR MAGNETICALLY RECORDING A TIME DIVISION MULTIPLEX SIGNAL

Filed Aug. 30, 1962 7 Sheets-Sheet 2

INVENTOR.
EDMUND RUSSELL ALTONJI

BY

Laurence S. Epstein
ATTORNEYS

INVENTOR.
EDMUND RUSSELL ALTONJI
BY
Laurence S. Epstein
ATTORNEYS

INVENTOR.
EDMUND RUSSELL ALTONJI
BY
Laurence S. Epstein
ATTORNEYS

Oct. 4, 1966 E. R. ALTONJI 3,277,246

APPARATUS FOR MAGNETICALLY RECORDING A TIME DIVISION MULTIPLEX SIGNAL

Filed Aug. 30, 1962 7 Sheets-Sheet 5

INVENTOR.
EDMUND RUSSELL ALTONJI

BY

Laurence S. Epstein
ATTORNEYS

Oct. 4, 1966 E. R. ALTONJI 3,277,246

APPARATUS FOR MAGNETICALLY RECORDING A TIME DIVISION MULTIPLEX SIGNAL

Filed Aug. 30, 1962 7 Sheets-Sheet 6

INVENTOR.
EDMUND RUSSELL ALTONJI
BY
Laurence S. Epstein
ATTORNEYS

INVENTOR.
EDMUND RUSSELL ALTONJI
BY
Laurence S. Epstein
ATTORNEYS 3,277,246

APPARATUS FOR MAGNETICALLY RECORDING A TIME DIVISION MULTIPLEX SIGNAL

Edmund Russell Altonji, Pequannock, N.J., assignor, by mesne assignments, to the United States of America Filed Aug. 30, 1962, Ser. No. 220,968
6 Claims. (Cl. 179—100.2)

The storage of multichannel, wideband phase coherent analog information on a magnetic tape with reasonable tape playing time is a formidable problem. A system whereby fifty-two individual 15 kc. bandwidth channels can be recorded and played back in real time has been developed. This system is utilized in simulating analog information for simulation purposes.

Figure 1:
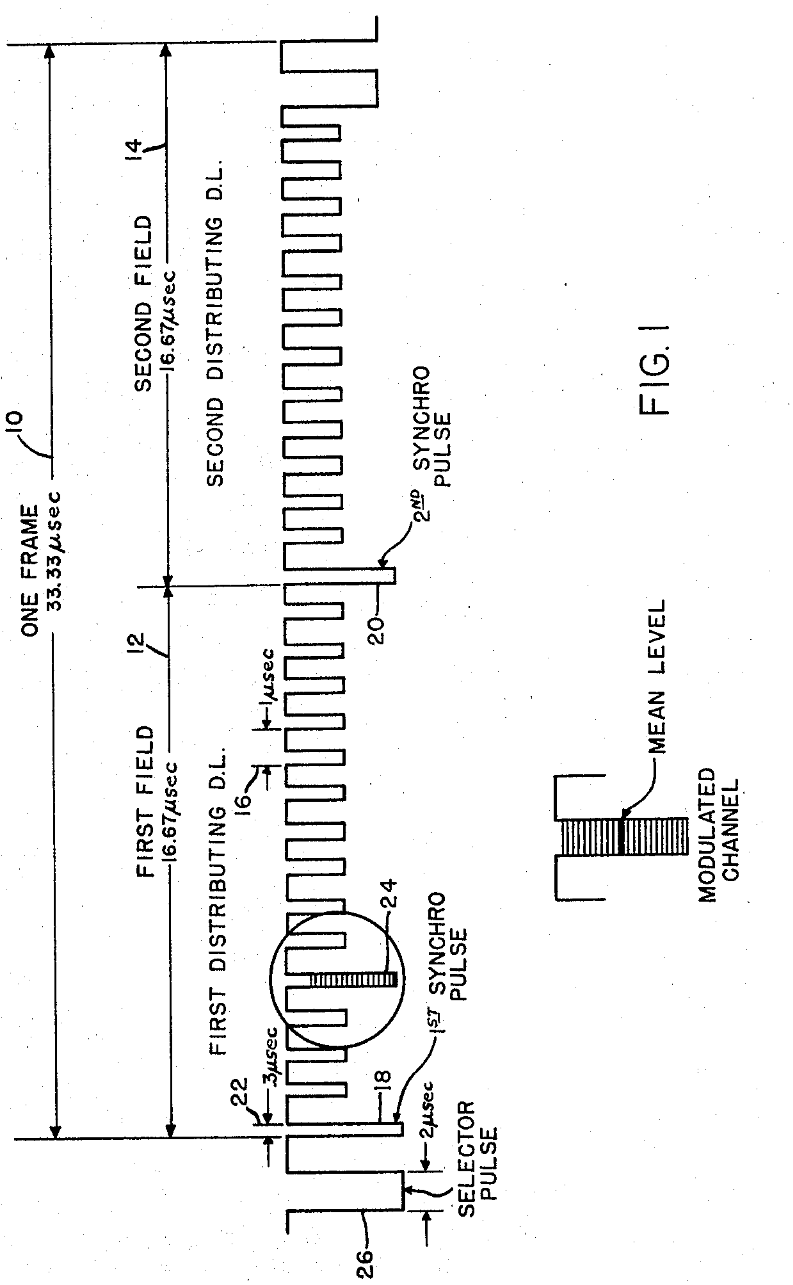
Figure 2A:
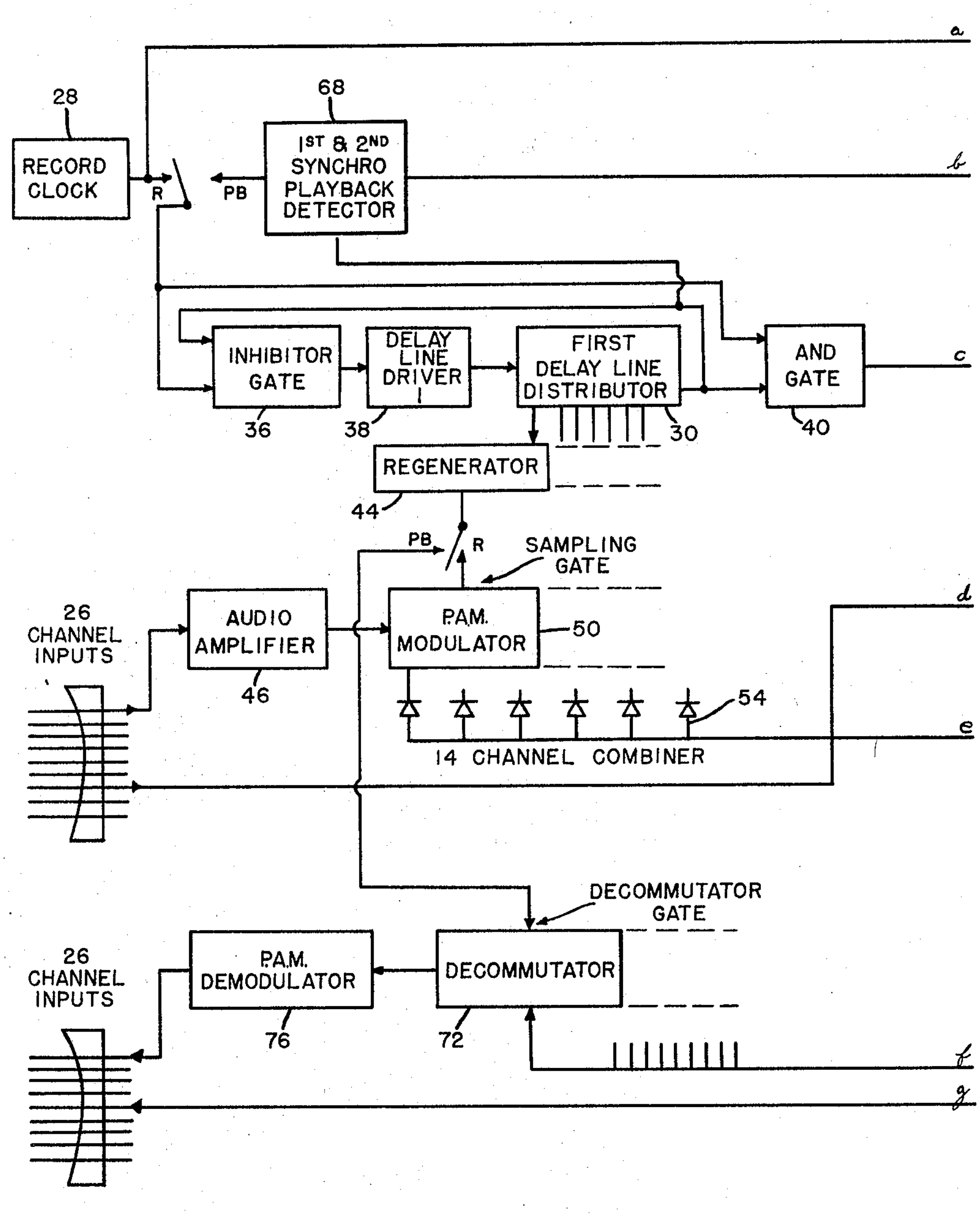
Figure 2B:
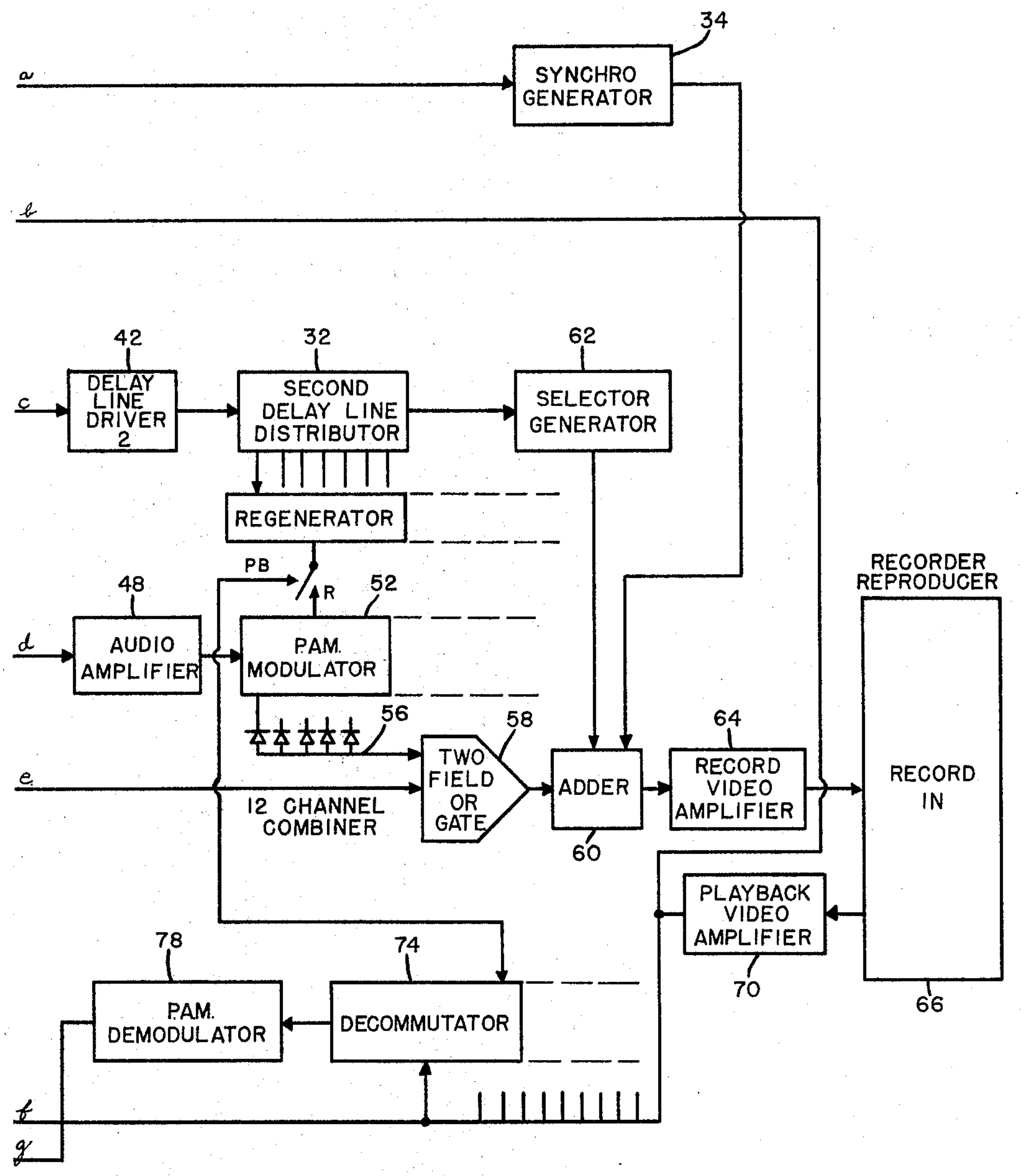
Figure 3:
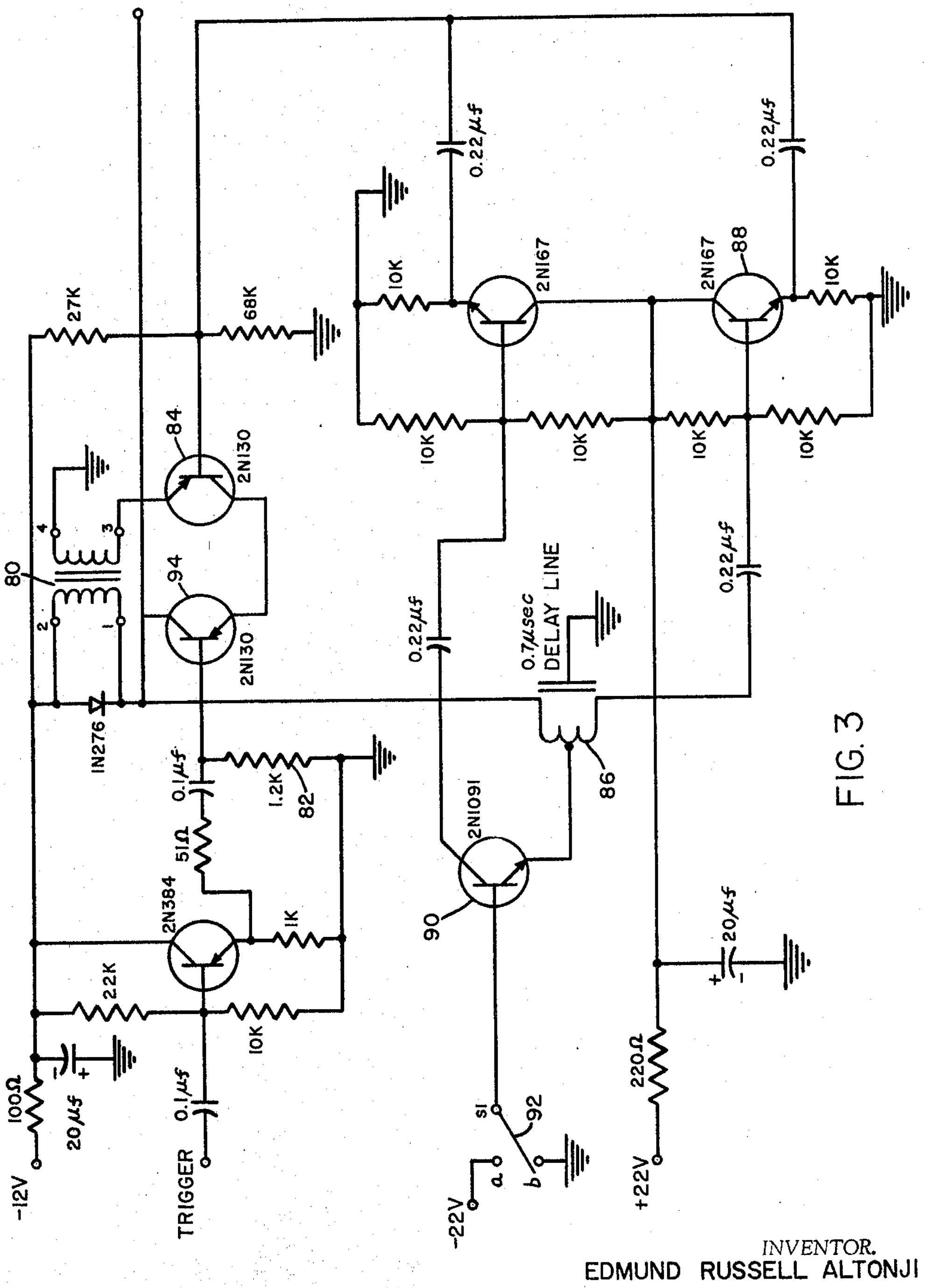
Figure 4A:
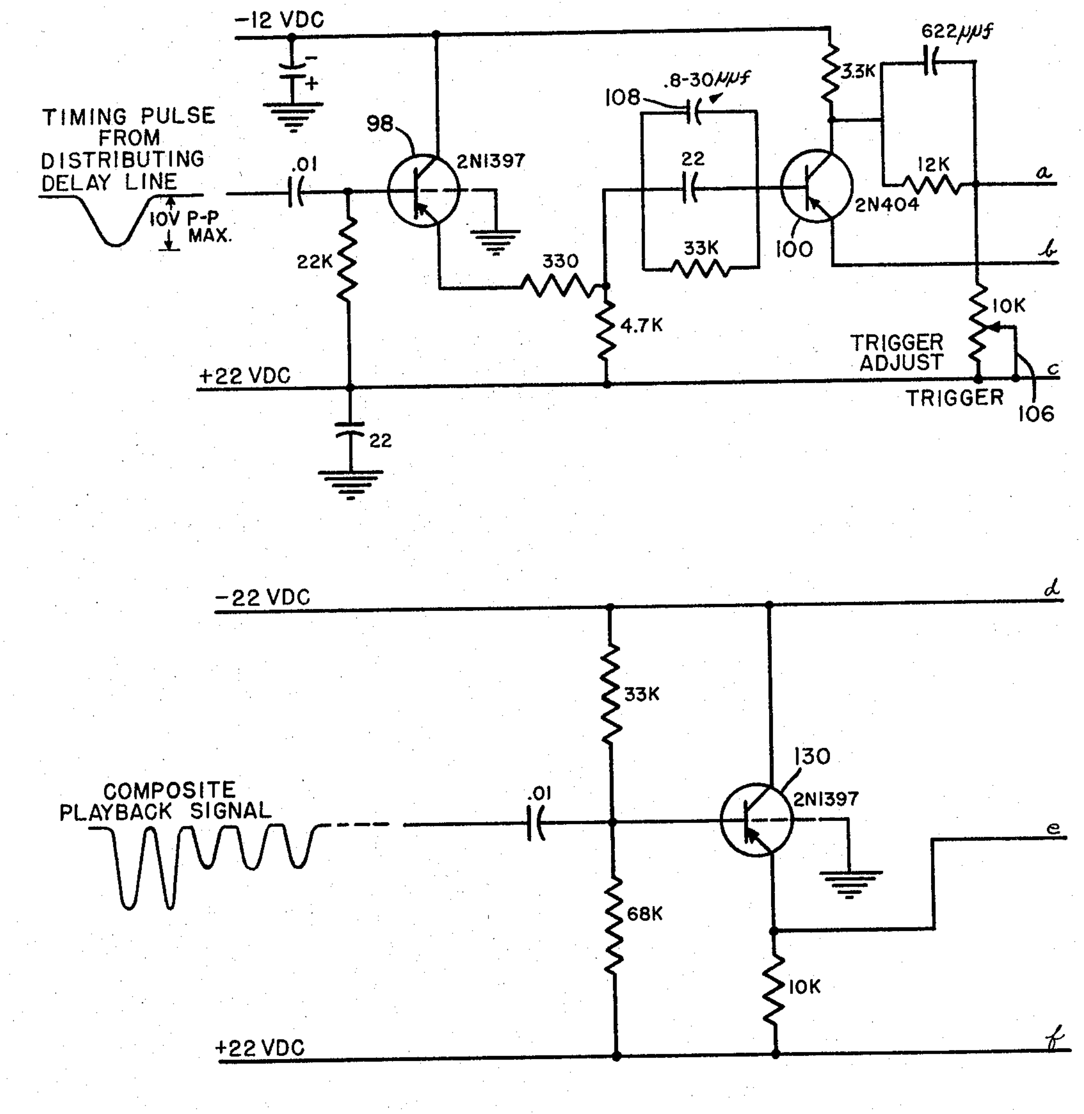
Figure 4B:
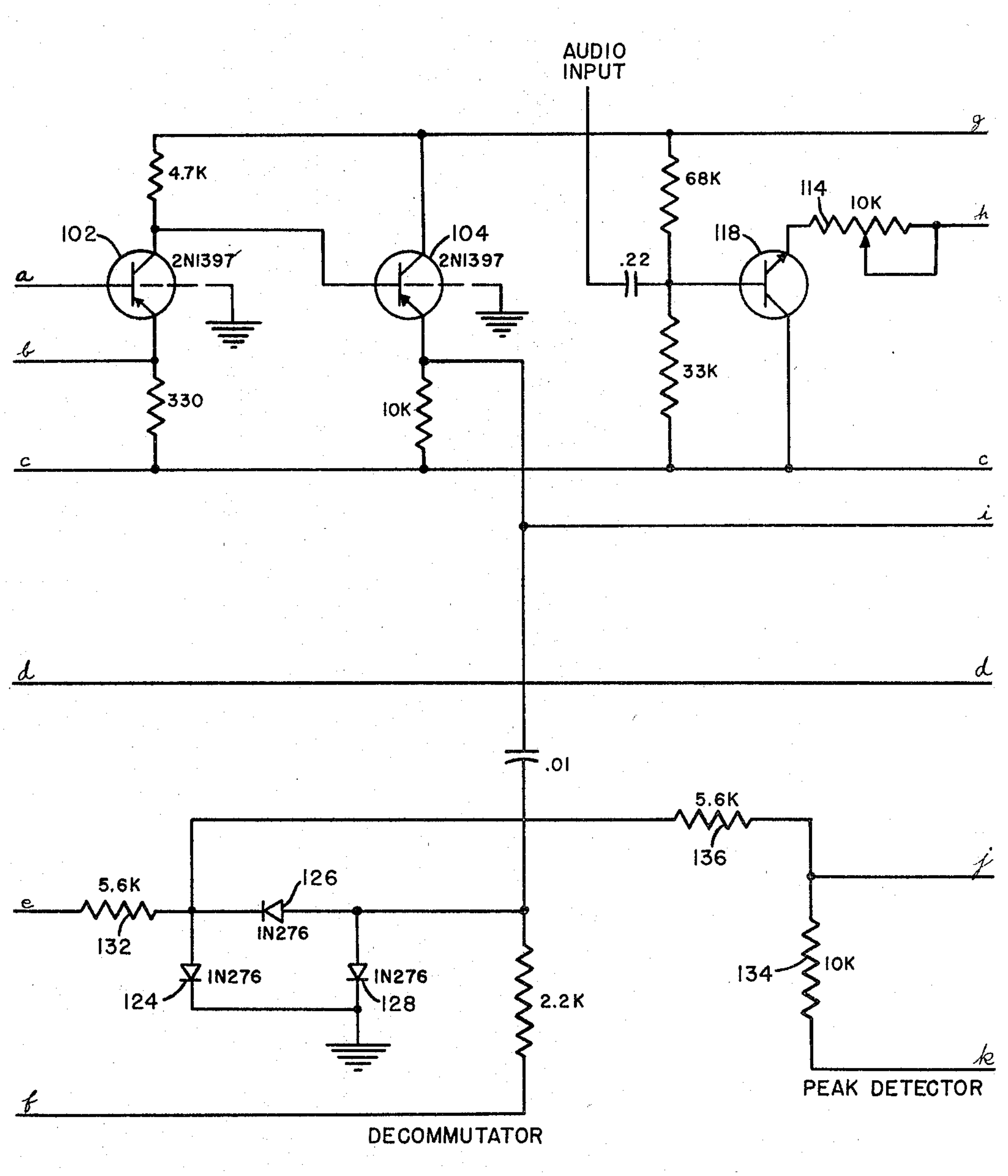
Figure 4C:
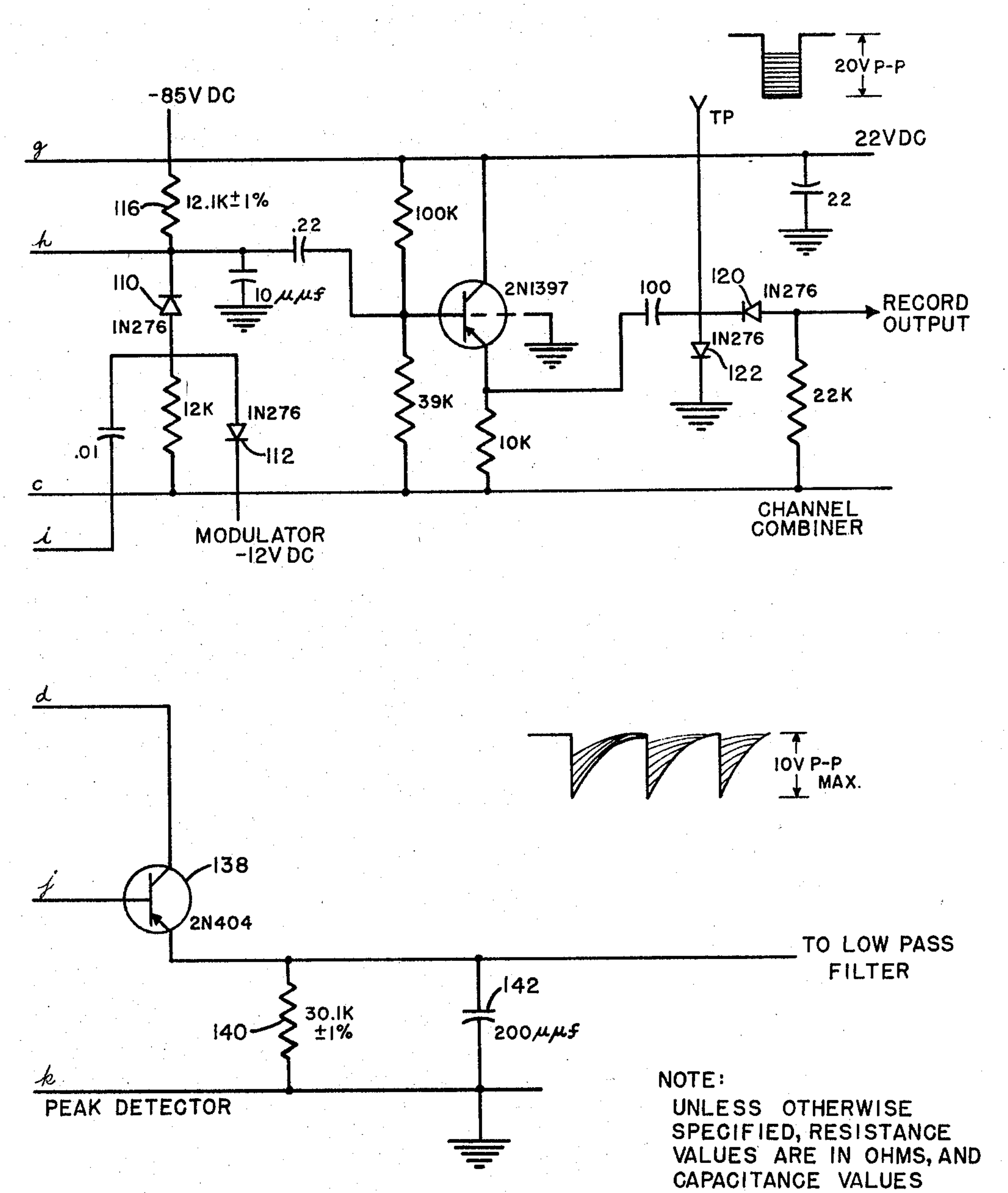

The present invention will be made known by describing the specific system and the circuitry when considered in connection with the accompanying drawings wherein:

FIG. 1 is a diagram of the system timing for one recording track;

FIGS. 2*a* and 2*b* are block diagrams of the audio system;

FIG. 3 is a schematic diagram of the delay line control blocking oscillator; and FIGS. 4*a*, 4*b* and 4*c* are schematic diagrams of the modulator and decommutator circuitry.

The system utilizes a conventional linear tape recording machine for recording wideband single track information to store fifty-two wideband analog by the use of time division multiplexing of signals. Twenty-six channels are recorded on each of the two wideband tracks of a recorder reproducer in the form of a pulse train. The amplitude of the individual pulses in this train carries the amplitude of the channel it represents. The rate at which these channels are sampled is 30 kc. Monopolar type of pulse amplitude modulation (PAM) is utilized in this system. The pulse having a normal amplitude is varied from this mean value by channel amplitude information. It will have only a single polarity as it goes through its maximum excursion. This is in opposition to the more commonly used bipolar type of pulse amplitude modulation whereby both the pulse amplitude and polarity are dictated by the channel information. Monopolar modulation was selected over bipolar modulation in the preferred embodiment of the invention because of the improvement of signal-to-noise interchannel crosstalk that can be realized over bipolar modulation. In addition, there is a component saving of approximately two to one.

Signal-to-noise improvement is realized in the instant system by storing the multiplex, monopolar PAM signal on the magnetic tape by frequency modulation recording. The recorder utilized in the preferred embodiment of the invention makes use of this type of wideband recording. A distributor is used in the instant system to establish the time basis for the sampling system. Each output from the distributor is connected to a channel modulator. The distributor output dictates to its channel modulator the time and duration that a channel information should be sampled. If the modulation outputs are all combined, a train of multiplex channels will result.

The distributor utilized in the instant invention is a delay line distributor. It is simple in nature. It is a multitap delay line which is driven from a clock standard and forms the time base for the sampling system since the outputs from the tape appear sequentially at discrete intervals. In the playback mode, the delay line generates decommutation gates, thus effecting economy of circuitry by common usage.

Two delay lines are utilized for recording each track.

This eliminates the need for rigid tap tolerances and long time delays. The frame interval is the time elapsed for all the channels to be sampled once and is divided into two fields. Each field corresponds to a time interval determined by the total delay in a distributing delay line.

Referring to FIG. 1, one frame is 33.33 microseconds in duration and represents the pulse amplitude modulation sampling rate of 30 kc. The initiating pulse in each field is termed a sync pulse and represents the time at which the distributing delay lines are driven. One frame is shown as number 10 in FIG. 1. The first field is shown as number 12 and the second field is shown as number 14. The channel and sampling pulses which are 0.3 microsecond in duration are number 16. The first sync pulse is number 18 and the second sync pulse is number 20. The first sync pulse 18 drives the first distributing delay 16 which in turn generates sampling pulses that are approximately 0.3 microsecond in duration and are spaced 1.0 microseconds apart. The second sync pulse 20 provides the drive for the second distributing delay line. As shown in FIG. 1, all the channels are unmodulated except number 24. This channel is shown in the expanded view as a monopulse in its fully modulated state. The composite signal shown in FIG. 1 is stored in one of two wideband magnetic tracks of the tape transport mechanism. Included in this composite signal are the twenty-six multiplex channels, the first and second sync pulses, 18 and 20 respectively, and the selector pulse 26. The selector pulse 26 is two-microseconds wide and precedes the first sync pulse. This pulse is necessary in the playback mode to allow the decommutation process to detect the first sync pulse from the composite playback signal. The detected first sync pulse will then be used to initiate the decommutator gates which will occur in proper synchronization with the playback channel pulses.

A simplified block system diagram is shown in FIGS. 2*a* and 2*b*. Since many of the blocks operate both during record and playback and to simplify the description, switches have been inserted in appropriate places having poles marked "R" for record and "PB" for playback.

During the record mode of operation a 60 kc. crystal oscillator is used for the standard record clock. This is shown as number 28 on FIG. 2*a*. Note that the clock rate is twice the sampling rate (30 kc.) to facilitate the driving and synchronizing of two distributors, 30 and 32, during one frame. The record clock output pulses are directed to three places; a sync generator 34, an inhibitor gate 36 which precedes the delay line driver 38; and an AND gate 40 which precedes the delay line driver 42. At the occurrence of the first record clock pulse, the inhibitor gate 36 is closed since it has only one input and the clock pulse is allowed to trigger the delay line driver number 38. This is turn drives the first delay line distributor 30 with an 0.3 microsecond pulse. At the same time the AND gate 40 preceding the delay line driver number 2 is open since it also has only one input, and prohibits the first clock pulse from passing through. As the driver pulse travels down the delay line 30, a series of channel sampling gates are generated. These are later shaped by regenerators 44. Approximately 16.6 microseconds later a pulse is applied to the inhibitor gate 36 and the AND gate 40 from the final delay line tap. This pulse will be in coincidence with the second clock pulse, and therefore, will cause the inhibitor gate 36 to be open and the AND gate 40 to be closed. This action will cause the delay line driver 2 to be triggered and the delay line driver 38 to be inhibited. A similar generation of channel sampling gates for the second field will take place. Since the first delay line distributor 30 was not driven by the second clock pulse; neither the inhibitor gate 36 nor the AND gate 40 will be pulsed during the time of the third clock pulse, and therefore, the procedure of driving the first distributing delay line will be repeated. The fourth clock pulse will of course drive the second distributing delay line 32 which generates channel sampling gates at a 30 kc. rate.

The inputs of the twenty-six wideband channels that are to be multiplexed are amplified through separate audio amplifiers 46 and 48. The audio amplifier outputs are applied to PAM modulators, 50 and 52 respectively. For simplicity the block diagram shows only an audio amplifier and a PAM modulator for one channel in the first field and for one channel in the second field. There are actually fourteen such modulator pairs in the first field and twelve in the second field. Each of the PAM modulators will sample the output from its audio amplifier at a time governed by its regenerated channel sampling gate. Since the PAM modulator outputs occur sequently, due to distributor action, they can be combined through a fourteen channel OR gate 54 for the first field and a twelve channel OR gate 56 for the second field. These two fields are now combined in the two field OR gate 58 and its output is applied to an adder 60. This adder 60 combines the first and second sync pulses produced by a sync generator 34, the selector pulse from the selector generator 62 and the two fields of multiplexed channels. The output of this adder is applied to the record video amplifier 64 and from there to the recorder-reproducer 66 to be stored onto the magnetic tape.

During the playback mode of operation it is necessary to decommutate out each channel from the composite playback signal so that they may be processed separately and applied to their appropriate output lines. In order to accomplish this, decommutating gates must be generated at the proper time and duration to straddle the playback channel pulses. The first and second sync pulses 18 and 20 in the composite playback signal carry the information to generate these decommutating pulses since there is a direct time relationship between the sync pulses and the channels in the respective fields. The first and second playback sync detector 68 selects the sync pulses from the output signal of the playback video amplifier 70. In this mode of operation, this detector operates as a playback clock and alternately drives the first and second distributing delay lines 30 and 32. Pulses, which will function as decommutating gates, will occur at the delay line taps. These gates are applied to individual decommutators 72 and 74 after they are regenerated. The width of these gates is a function of the delay line driver 38 and delay line driver 42. In the playback mode the delay line drives supply the lines with an 0.8 microsecond pulse rather than an 0.3 microsecond pulse used in the record mode. This pulse effectively straddles the playback channel pulses. Each of the decommutators are fed with the composite playback signal after it has been amplified by the playback video amplifier 70. A decommutator output only occurs when there is coincidence between a decommutator gate and a channel of the composite signal. The output from the decommutator is then applied to PAM demodulator, respectively 76 or 78, where the original channel information is recovered.

The delay line used in the preferred embodiment has the following characteristics; it has a delay of 16.7 microseconds, a rise time at the last tap of 0.16 microsecond, a characteristic impedance of 400 ohms, a tap tolerance of + or −0.1 microsecond, an attenuation of 20% and has a temperature coefficient of 0.00007 microsecond per degree centigrade.

The delay line driver circuitry provides the drive pulses for the delay line distributor in a time-sequence established by the record or playback clock circuitry. The delay line driver is capable of providing two pulse lengths to the delay line distributors, 0.3 microsecond and 0.8 microsecond respectively. The delay line driver is a variable width delay line control blocking oscillator circuit. The schematic diagram of this circuit is shown in FIG. 3. It operates as follows: The pulse width of a blocking oscillator circuit can be adjusted with certain limits by modifying the rate of change of primary current in the transformer 80 thereby modifying the time required for saturation of the circuit and thereby changing the pulse lengths. The blocking oscillator transformer 80 used determines the range of pulse widths obtainable and the rate of change of current, is in this case, governed by the resistor 82.

More than one pulse width can be obtained from the blocking oscillator if its natural cycle is interrupted at a time shorter than the natural pulse width. The pulse width is controlled by opening the main current loop at this selected time. This is accomplished in the circuit by cutting off transistor 84, with a positive pulse that is delayed from the start of the output pulse. Initially transistor 84 is biased at saturation and appears almost as a short circuit to the blocking oscillator circuit. The output pulse is fed back through a delay line 86 and an emitter follower 88 to the base of transistor 84 which it cuts off at a time determined by the delay of discrete delay line 86.

Transmitter 90 is connected in series with an 0.2 microsecond tap of the delay line 86. When the narrow pulse is desired, switch S1 92 is in position *b* and a ground connection is made. This condition forward biases transistor 90 by virtue of the negative voltage present at the collector of transistor 94 and the D.C. path to ground through the delay line 86 and transistor 90. Transistor 90 is now saturated and appears at a short circuit. The pulse width is determined by the time at which transistor 84 is turned off and an output pulse of 0.3 microsecond is obtained.

With switch 92 in position *a* transistor 90 is back-biased and the pulse from the 0.2 microsecond tap does not pass through. This results in an 0.8 microsecond pulse at the blocking oscillator output. When the circuit is set for the narrow pulse, the feedback path for the wide pulse need not be opened since the blocking oscillator has already been turned off, and is not affected by the second cut-off pulse. The delay line delays are 0.2 and 0.7 microsecond, and the output pulse widths of the blocking oscillator are 0.3 and 0.8 microsecond respectively. The 0.1 microsecond delay between the cut-off pulse and actual cut-off is inherent in the circuit and is constant for various pulse widths. A major factor is that a time lag is involved when transistor 84 is driven from saturation to cut-off. A "mesa" transistor (2N1301) with an extremely fast switching time is utilized in the preferred embodiment as transistor 84 to reduce this effect. The same type of transistor is also used as transistor 94 in this circuit for the same reason.

The PAM modulator-decommutator unit consists of three basic circuits; the Schmitt trigger, which regenerates the degraded pulses coming from the distributing delay line; the modulator which samples an audio signal for one particular channel during the record mode; and the decommutator which separates one channel from the composite signal during the playback mode.

The Schmitt trigger (shown in FIGS. 4*a* and 4*b*) comprising transistors 98, 100, 102 and 104 and associated circuitry, regenerates two different width pulses received from the distributing delay line. In the record mode, a rounded −10 volt, 0.3 microsecond pulse is regenerated to a −28 volt, 0.3 microsecond rectangular pulse, for use in the PAM modulator. In the playback mode, a rounded −10 volt, 0.8 microsecond pulse is regenerated to a −28 volt, 0.8 microsecond rectangular pulse for use in the decommutator.

The operation of this circuit is as follows: The rounded pulse from the distributing delay line, either 30 or 32, is fed in through the emitter follower 98. Transistors 100 and 102, which make up the Schmitt trigger are biased so that an emitter voltage of +18 volts is found at each emitter. Since the base of transistor 100 is normally at +22 volts, a —4 volt pulse is needed to start triggering action and regeneration occurs in the circuit. At the end of the input pulse period, the circuit returns to its "rest" condition rapidly, resulting in a rectangular pulse at the collector of transistor 102. Potentiometer 106 adjusts the triggering level of transistor 100. The width adjustment capacitor 108 controls the amount of pulse current in transistor 100, thus affecting storage time and output pulse width. The output of the Schmitt trigger is fed directly to the emitter follower 104 and hence to the modulator and decommutator.

When no sampling pulses are present, diodes 110 and 112 are forward biased and the junction of resistors 114 and 116 is at —12 volts. A sampling pulse from the Schmitt trigger turns off both diodes and the voltage at the junction is determined by their voltage division ratio, the voltage at the emitter of transistor 118 and the —85 volts supply voltage. When no audio signal is present the level adjust potentiometer 114 is adjusted to give —23 volts at junction of resistors 114 and 116. A fully modulated audio signal causes this voltage to swing from —13 volts to —33.5 volts. Thus a train of negative pulses, occurring at a 30 kc. rate, whose envelope can vary up to 20 volts peak-to-peak, is coupled into an emitter follower whose output drives a channel combiner.

One leg of this channel combiner is at the output of each PAM modulator. A complete field is constituted by connecting these outputs together to form a multichannel OR gate. When no pulses are present, diodes 120 and 122 are forward biased and the output is at ground. When a pulse sample appears at another PAM modulator, diode 120 becomes back-biased and the pulse appears at the output, but does not affect any other PAM modulator. The composite signal is fed to the two-field OR gate 58 to form one frame of the total composite signal.

In the playback mode, the regenerated pulse from the Schmitt trigger circuit is called a channel selector gate. When no channel selector gate is present, diodes 124, 126 and 128 are all forward biased and the junction is essentially at ground. As a result, pulses from the composite playback signal coming from the emitter follower 130 do not appear at this point, but are dropped across resistor 132.

When a channel selector gate occurs at the same time as the channel pulse to be decommutated, its presence back biases diodes 124, 126 and 128 so that the channel pulse is now passed through and is fed to the emitter follower. Resistors 132, 134 and 136 act to attenuate the pulse so that the maximum pulse appearing at the emitter of transistor 138 is —10 volts. The output is coupled to a peak detector, resistor 140 and capacitor 142, to stretch the pulse that has been decommutated. The stretched pulse information is directed to a low pass filter where it is demodulated to recover the original audio signal information for the particular channel selected.

Obviously many modifications and variations of the present invention are possible in the light of the above teachings. It is therefore to be understood that within the scope of the appended claims the invention may be practiced otherwise than as specifically described.

What is claimed is:

1. An apparatus for storage of multichannel, wideband analog information comprising in combination a multiplicity of channel inputs, a clock means, delay line distribution means and synchronizing signal generation means, said synchronizing signal generation means and said delay line distribution means being operatively connected to said clock generation means, said delay line distribution means being operatively connected to said multiple channel input means for control thereof, the outputs of said multiple channel input means being operatively connected to the output of said synchronizing signal generation means, magnetic recording means, said magnetic recording means being operatively connected to the output of said synchronizing signal generation means and the output of said multiple channel input means, whereby the multiple channel input information is recorded onto storage means by said recording means.

2. The combination of claim 1 and playback means, said playback means comprising demodulation and decommutator means operatively connected to the output of said delay line distribution means, a multiplicity of output channel means, said multiplicity of output channel means being operatively connected to said demodulation and decommutator means, said recording and playback means being operatively interconnected to said decommutation and demodulation means and to said magnetic storage means whereby said information recorded on said magnetic storage means is coherently played back.

3. The combination of claim 2 wherein said delay line distribution means comprise a first channel and a second channel, said first channel having an inhibitor input gate, a delay line driver means operatively connected to the output of said inhibitor gate and controlled thereby, a first delay line distributor connected to the output of said delay line driver and controlled thereby, the output of said first delay line distributor means being fed back to the input of said inhibitor gate, said second channel having an input AND gate, the input to said first channel input inhibitor gate and the output of said first channel delay line distributor means being connected thereto, a second delay line driver connected to the output of said input AND gate, and a second delay line distribution means connected to the output of said second delay line driver means and controlled thereby, whereby said first and second channels control the application of multiple signal means in accordance with clock pulse signals.

4. The combination of claim 3 and combination and regeneration means operatively connected between each of said channel delay line distribution means and said multiplicity of channel input means.

5. The combination of claim 4 and adding means operatively connected to the output of said synchronizing signal generation means, to said delay line distribution means and to said regeneration and modulation means for combining said outputs into a composite signal for recording on said magnetic storage means, and recording video amplifier means, said adding means being operatively connected to said recording means through said recording video amplifier means.

6. The combination of claim 5 wherein said pulse amplitude modulation modulator-decommutator means comprise Schmitt trigger means, modulation means operatively connected to the output of said Schmitt trigger means, channel combining means operatively connected to the output of said modulator means, decommutation means operatively connected to the output of said Schmitt trigger means and peak detector means operatively connected to the output of said decommutator means, whereby incoming signals are regenerated by said Schmitt trigger means for control of said modulation means.

No references cited.

BERNARD KONICK, *Primary Examiner.*

A. I. NEUSTADT, *Assistant Examiner.*